(12) United States Patent
Lee

(10) Patent No.: US 6,192,090 B1
(45) Date of Patent: Feb. 20, 2001

(54) CIRCUIT AND METHOD FOR ADAPTIVELY CALCULATING DECISION ERROR OF DIGITAL SIGNAL IN DIGITAL MODULATION SYSTEM

(75) Inventor: Myeong-Hwan Lee, Kyungki-do (KR)

(73) Assignee: Samsung Electronics Co., Ltd., Kyungki-do (KR)

(*) Notice: Under 35 U.S.C. 154(b), the term of this patent shall be extended for 0 days.

(21) Appl. No.: 08/921,050

(22) Filed: Aug. 29, 1997

(30) Foreign Application Priority Data

Aug. 30, 1996 (KR) .................................................. 96-37163

(51) Int. Cl.[7] .............................. H03D 1/04; H03D 1/06; H03K 5/01; H03K 6/04
(52) U.S. Cl. ........................... 375/346; 375/278; 375/284
(58) Field of Search .................................... 375/224, 278, 375/284, 346, 350, 340

(56) References Cited

U.S. PATENT DOCUMENTS

| | | | |
|---|---|---|---|
| 4,447,910 | * | 5/1984 | Smith et al. ........................... 375/346 |
| 5,406,587 | * | 4/1995 | Horwitz et al. ....................... 375/346 |
| 5,602,601 | * | 2/1997 | Kim et al. ............................. 348/607 |
| 5,796,786 | * | 8/1998 | Lee ........................................ 375/326 |

\* cited by examiner

*Primary Examiner*—Don N. Vo
*Assistant Examiner*—Phuong Phu
(74) *Attorney, Agent, or Firm*—Sughrue, Mion, Zinn, Macpeak & Seas, PLLC

(57) ABSTRACT

A circuit and method for adaptively calculating a decision error of a digital signal in a digital modulation system. The circuit includes a digital filter for Hilbert transform filtering I channel data to generate Q channel data which differs in phase from the I channel data, a delayer for delaying the I channel data for a filtering time of the digital filter, a reference signal interval processor for receiving the I channel data and generating a reference signal pulse for detecting a slope, an estimation and adaptive decision error detector for receiving the I channel data delayed from the delayer during a detected interval of the reference signal pulse, deciding symbol data and generating an adaptive decision error signal according to a detected slope, and a slope detector for receiving the decision error signal generated by the estimation and adaptive decision error detector and the Q channel data generated by the digital filter, detecting the slope during the detected interval of the reference signal pulse and generating the accumulated slope.

17 Claims, 5 Drawing Sheets

CIRCUIT AND METHOD FOR ADAPTIVELY CALCULATING DECISION ERROR OF DIGITAL SIGNAL IN DIGITAL MODULATION SYSTEM

BACKGROUND OF THE INVENTION

1. Field of the Invention

The present invention relates to a circuit and method for calculating a decision error of a digital signal in a digital modulation system and, more particularly, to a circuit and method for adaptively calculating a decision error by limiting a phase detecting decision region.

2. Description of the Related Art

Recently, there has been a demand for a color television having a large-sized screen with high resolution and high picture quality along with realistic sound. In line with this recent trend, the first HDTV (High Definition TV) broadcasting has been implemented on the basis of an analog transmission system. The HDTV transmission system developed in Japan is called a MUSE (Multiple Sub-Nyquist Sampling Encoding) transmission system. The United States has used a VSB (vestigial sideband) modulation adopted by the GA (Grand Alliance) committee as a modulation system of the HDTV system, and proposed schematic configurations therefor. The VSB modulation is used as a method of modulating an analog video signal in existing TV broadcasting.

The GA-HDTV proposed by the GA committee transmits a digital modulation signal by using a VSB signal. In an initial DSC (Digital Spectrum Compatible) HDTV, 2-level and 4-level VSB modulation systems using 2 and 4 levels have been adopted. However, in the GA-HDTV, an 8-level VSB modulation system using 8 levels and a 16-level. VSB modulation system applied to a high speed cable mode have been adopted. To demodulate the VSB signal, the GA committee has proposed a VSB receiver of the HDTV having the following features.

The VSB receiver of the HDTV proposed by the GA committee implements sampling by a unit of symbol rate by detecting data by only a signal of an I (In-phase) channel unlike other demodulators of the digital modulation signal. Therefore, the VSB receiver of the HDTV proposed by the GA committee has a very simple structure compared with a receiver of QAM (Quadrature Amplitude Modulation) etc. using both an I channel and a Q (quadrature) channel. Moreover, since received data is processed by a unit of symbol rate, it is possible to detect the data even though a processing speed is relatively lower than a fractional rate receiver.

The proposed VSB receiver uses synchronous detection for recovering a carrier wave when detecting digital data from the VSB modulation signal. The synchronous detection has an advantage in that it is possible to detect the data with a lower error rate than asynchronous detection at the same signal-to-noise ratio. However, the structure of the VSB receiver is complicated due to a carrier wave recovery circuit. Therefore, the proposed VSB receiver uses a FPLL (Frequency and Phase Locked Loop) and a PTL (Phase Tracking Loop) circuit in detecting the phase of a transmission signal for the synchronous detection.

The FPLL performs phase tracking of the transmission signal by using a pilot signal contained in the VSB signal. This FPLL can be easily achieved by a frequency error detecting circuit of a conventional PLL (Phase Locked Loop) and is described in GA-HDTV system recommendations. An output of the FPLL passes though a channel equalizer and is further applied to an input of the PTL circuit. The PTL circuit eliminates phase noise, that is, phase error which is not eliminated in the FPLL. The structure of the PTL circuit of the GA-HDTV receiver is not greatly different from that of a DDCR (Decision Directed Carrier Recovery) circuit. However, the PTL circuit estimates rotation components of signal points by using sampling data of an input I channel and compensates a phase error value. In data of the I channel, information to be actually transmitted is contained. The Q channel has no function for transmitting actual information but reduces a spectrum of the modulation signal. If there is a phase error during demodulation, not only data of the I channel but also data of the Q channel is contained in the sampling data of the I channel. Therefore, in order that the PTL circuit corrects the phase error, information of the Q channel is also needed. The information of the Q channel can be easily obtained by filtering the data of the I channel by use of a Hilbert transform filter.

FIG. 1 is a block diagram showing a GA-HDTV receiver proposed as a standard by the GA committee. The overall operation for the VSB receiver of FIG. 1 is described in a paper entitled "DESIGN AND PERFORMANCE ANALYSIS OF PHASE TRACKER FOR SYNCHRONOUS VSB RECEIVER" published in the Autumn Synthesis Science Publication Paper Collection issued in 1994 by the Korean Institute of communication science.

As shown in FIG. 1, a system using the digital VSB modulation decides a digital signal through an equalizer 50 and a PTL 60 and utilizes a decision error value. For digital signal decision through the equalizer 50 and the PTL 60, the digital signal is decided to the nearest symbol by using a received I signal as shown in FIG. 2. To reduce the chance of a wrong decision due to the phase error etc., there is used an adaptive decision method calculating a slope indicated by an oblique line in FIG. 2 by using a Q signal obtained from the I signal. While a fixed decision region is liable to result in an incorrect decision even from a small vestigial phase error, an adaptive decision region can reduce a decision error by obtaining the slope from data of a constant number. However, a circuit for deciding the digital signal to both I and Q axes becomes complicated.

SUMMARY OF THE INVENTION

It is therefore an object of the present invention to provide a circuit and method for calculating a decision error according to the state of an input signal by adaptively limiting a decision region in a digital modulation system.

It is another object of the present invention to provide a circuit and method for simplifying hardware construction and performing a stable operation.

The present invention includes a circuit for adaptively calculating a decision error of a digital signal by limiting a decision error region in a digital modulation system. One embodiment of the circuit includes a digital filter for Hilbert transform filtering I channel data to generate Q channel data which differs in phase from the I channel data, a delayer for delaying the I channel data for a filtering time of the digital filter, a reference signal interval processor for receiving the I channel data and generating a reference signal pulse for detecting a slope, an estimation and adaptive decision error detector for receiving the I channel data delayed by the delayer during a detected interval of the reference signal pulse, deciding symbol data and generating an adaptive decision error signal according to a detected slope, and a slope detector for receiving the decision error signal generated from the estimation and adaptive decision error detector and the Q channel data generated from the digital filter, detecting the slope during the detected interval of the reference signal pulse and generating the accumulated slope.

The present invention also includes a method for adaptively calculating a decision error of a digital signal by limiting a decision error region in a digital modulation system. In one embodiment, the method includes the steps of detecting a reference signal pulse from I channel data, receiving the I channel data and Q channel data during a detected interval of the reference signal pulse and deciding symbol data by the I channel data and Q channel data of a limited region, and adaptively calculating a decision error value according to a calculated slope.

The present invention will be more specifically described with reference to the attached drawings.

DETAILED DESCRIPTION OF THE PREFERRED EMBODIMENT

Figure 1:
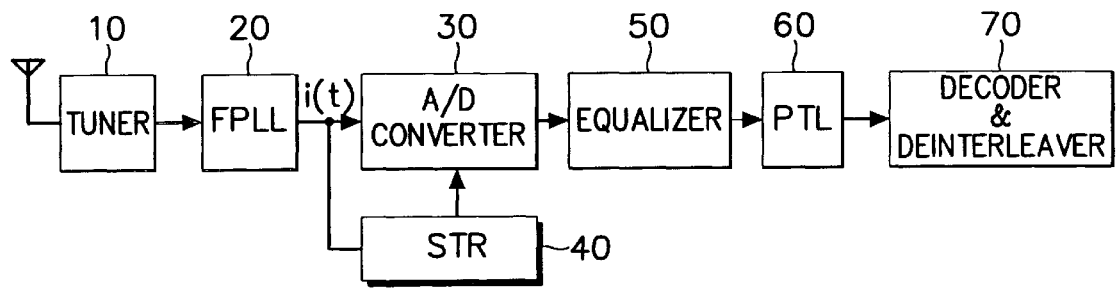
FIG. 1 is a block diagram of a GA-HDTV receiver proposed by the GA committee of U.S.
Figure 2:
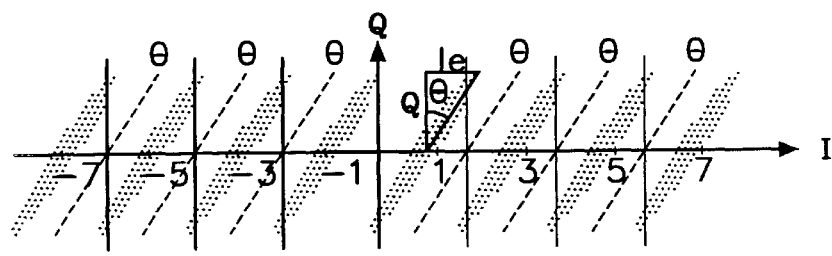
FIG. 2 is a scattering diagram showing a conventional signal decision method and an input signal having an error.
Figure 3:
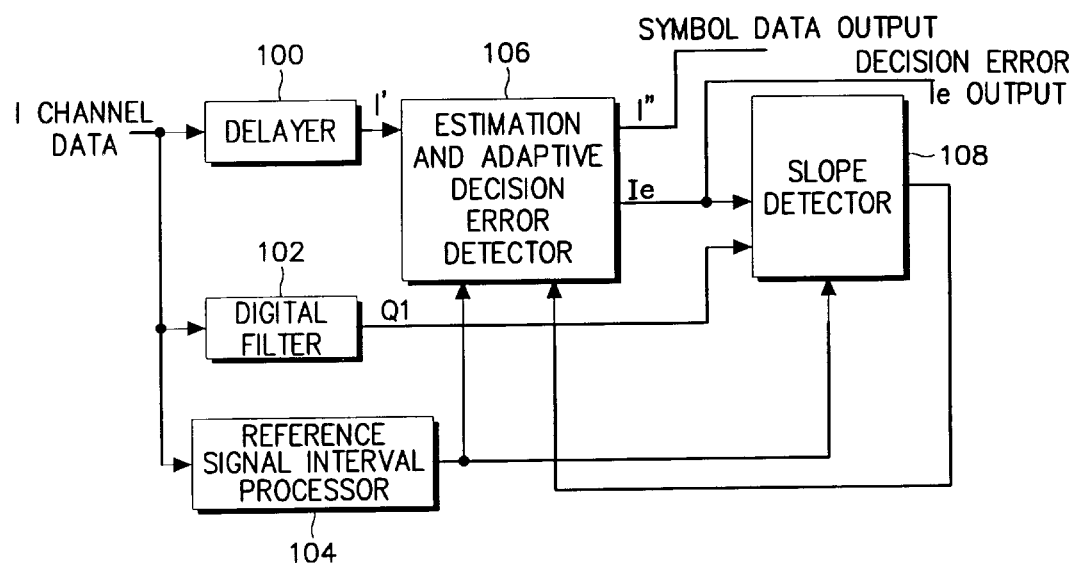
FIG. 3 is a block diagram of a circuit for adaptively calculating a decision error according to one preferred embodiment of the present invention.

FIG. 3 is a block diagram showing a circuit for adaptively calculating a decision error. A digital filter 102 Hilbert transform filters input I channel data to generate first Q channel data, for example, Q1 channel data which differs in phase from the I channel data. A delayer 100 delays the input I channel data for a filtering time of the digital filter 102. A reference signal interval processor 104 receives the input I channel data and generates a reference signal pulse for detecting a slope. An estimation and adaptive decision error detector 106 receives the delayed I channel data during the detected interval of the reference signal pulse, decides symbol data according to the slope and generates a decision error signal Ie. A slope detector 108 receives the decision error signal Ie generated from the estimation and adaptive decision error detector 106 and the Q1 channel data generated from the digital filter 102, accumulates the slope during the detected interval of the reference signal pulse and supplies the accumulated slope to the estimation and adaptive decision error detector 106.

Figure 4:
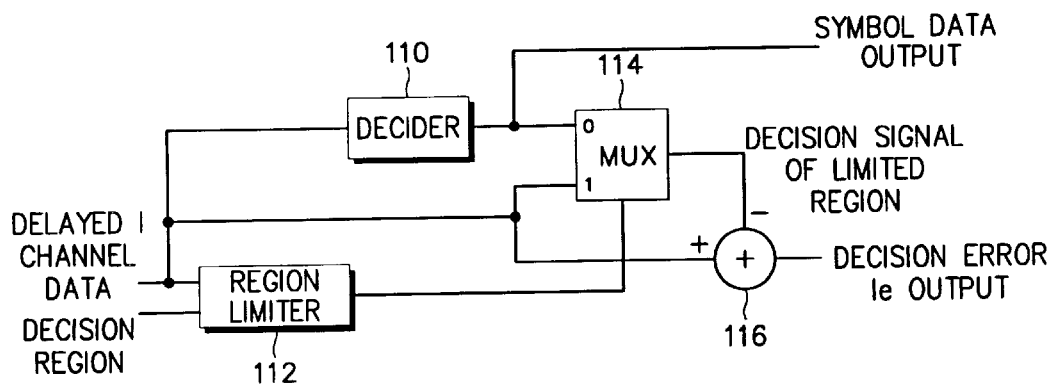
FIG. 4 is a detailed block diagram of an estimation and adaptive decision error detector shown in FIG. 3.

FIG. 4 is a detailed block diagram of the estimation and adaptive decision error detector 106 shown in FIG. 3. A decider 110 receives the I channel data delayed from the delayer 100 and decides the symbol data to a reference level value. A region limiter 112 compares the I channel. data delayed from the delayer 100 with a decision region corresponding to the slope and generates a limited region decision signal. A multiplexer (MUX) 114 receives the symbol data decided from the decider 110 and the delayed I channel data and selectively generates either the symbol data or the delayed I channel data in response to the limited region decision signal generated from the region limiter 112. A subtracter 116 subtracts a signal generated from the MUX 114 from the delayed I channel data to generate the decision error signal Ie.

Figure 5:
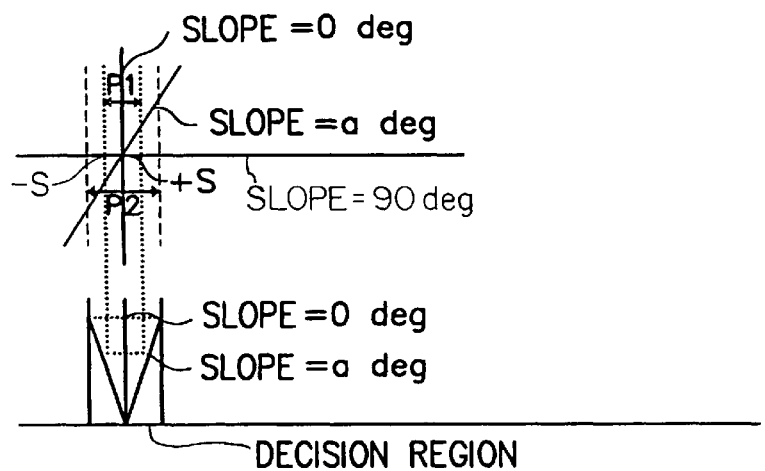
FIG. 5 is an operational waveform chart of FIG. 3.
Figure 6:
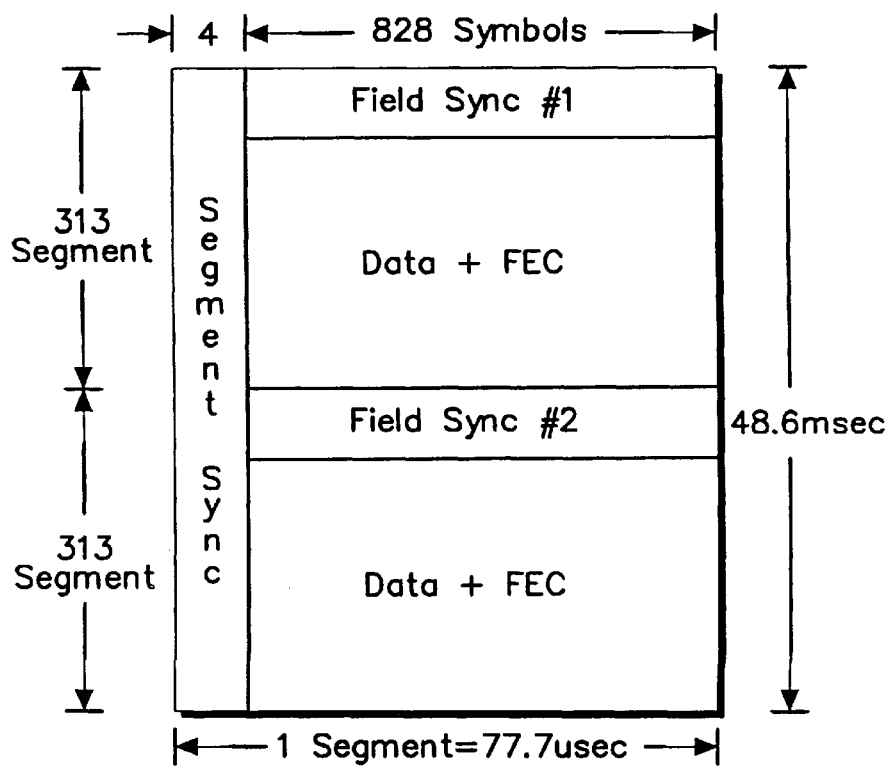
FIG. 6 shows a signal format of a GA-VSB system.

FIG. 5 is a showing waveform characteristic of the operation slope detector 108 of FIG. 3. FIG. 6 shows a signal format of a GA-VSB system.

One preferred embodiment of the present invention will now be described with reference to FIGS. 3 to 6.

To decide the symbol data is to limit a value of an input signal according to a slope a. If a reference signal is used in the GA-VSB system, segment synchronization or field synchronization -may be used and an equalizer or a PTL using an estimator may be applied. The signal format of the GA-VSB system has the field synchronization corresponding to one segment per field and the segment synchronization of 4-symbol data per segment. Since these data are fixed values, they may be used in calculating the slope a. For example, a data segment has forms of +S, −S, −S and +S. In this case, if level values of the symbol data defined from a transmitting side and a receiving side are defined as −7, −5, −3, −1, +1, +3, +5 and +7, +S and −S correspond to +5 and −5.

In the GA-VSB system, since only the I channel signal is received when deciding the symbol data, Q channel information is needed to extract phase information from the I channel signal. The Q channel signal is recovered from the I channel signal by using the I channel signal and the digital filter 102 which is a Hilbert transform filter. The digital filter 102 shown in FIG. 3 recovers the Q' channel data by Hilbert transform filtering the input I channel data. The delayer 100 delays the input I channel data for the filtering time of the digital filter 102. The reference signal interval processor 104 detects the reference signal pulse for detecting the slope from the I channel data and supplies the reference signal pulse to the estimation and adaptive decision error detector 106 and the slope detector 108. The estimation and adaptive decision error detector 106 decides the I channel symbol data and generates the decision error signal Ie. In the estimation and adaptive decision error detector 106 of FIG. 4, the region limiter 112 compares the I channel data with the limited region to limit the decision region. If the I channel data exists within the range of limited region, the region limiter 112 supplies "0" to a select terminal of the MUX 114. If the I channel data is beyond the range of the limited region, the region limiter 112 supplies "1" to the select terminal of the MUX 114. The decider 110 decides the symbol value of the I channel data to a setting reference level. If there are 8 levels and if the I channel data is between 0 and 2, the decision output is "1". If the I channel data exists at a boundary portion, for example, 2, 4 or 6 etc., the same rule of rounding it up or down is applied. The MUX 114 selectively generates either the decision output decided from the decider 110 or the I channel data in response to a signal generated from the region limiter 112. Therefore, if the output signal of the region limiter 112 is "1", the MUX 114 generates the I channel data since the input signal of the region limiter 112 exists beyond the range of the limited region corresponding to the calculated slope. The subtracter 116 subtracts the I channel data of the same input signal from the I channel data to generate the decision error signal Ie of "0". Meanwhile, if the output signal of the region limiter 112 is "0", the MUX 114 generates the decision output of the decider 110 since the input signal of the region limiter is within the range of the limited region corresponding to the calculated slope. The subtracter 116 subtracts the decision signal decided to the setting reference level value from the I channel data to generate the decision error Ie. In an initial state, the decision region is a general decision region as indicated by P2 of FIG. 5. The slope detector 108 calculates the slope value a by the following equations (1) and (2) with respect to the range of levels while the reference signal pulse is detected from the reference signal interval processor 104:

$$a = \left| \frac{1}{N} \sum_N \text{ATAN} \frac{Ie}{Q} \right| \quad (1)$$

$$I_e = I' - I'' \quad (2)$$

where I' is the input signal, I'' is the symbol data value of a decision result and N is the number of symbols within the detected interval of the reference signal pulse. If the detected interval of the reference signal pulse is over, the decision region for detecting the decision error by the estimation and adaptive decision error detector 106 is changed to P1 shown in FIG. 5, with respect to the levels +S and −S by using the accumulated slope value. In the above equation (1), 1/N may be eliminated to simplify the hardware. Further, Q may use only its sign. In many cases, since Q estimated by the order of the digital filter is not reliable, the sign of Q is used. This method operates irrespective of the order of the digital filter. That is, the slope a may be calculated by the following equation (3):

$$a = \left| \frac{1}{N} \sum_N \text{sgn}(Q) Ie \right| \quad (3)$$

where 1/N may be eliminated, and sgn(Q) is sign data of the Q channel. Until the next reference signal is received, the estimation and adaptive decision error detector 106 operates with the fixed slope. The decision region for obtaining the decision error is limited according to the calculated slope as shown in FIG. 5. The input signal beyond the range of the decision region is not used since the decision error is "0". In FIG. 5, a part of a signal at a degrees is beyond the range of the decision region. If the slope is calculated by using a random signal, the reference signal interval processor 104 may be replaced with a pulse generator for generating an interval signal in order to calculate the slope.

Figure 7:
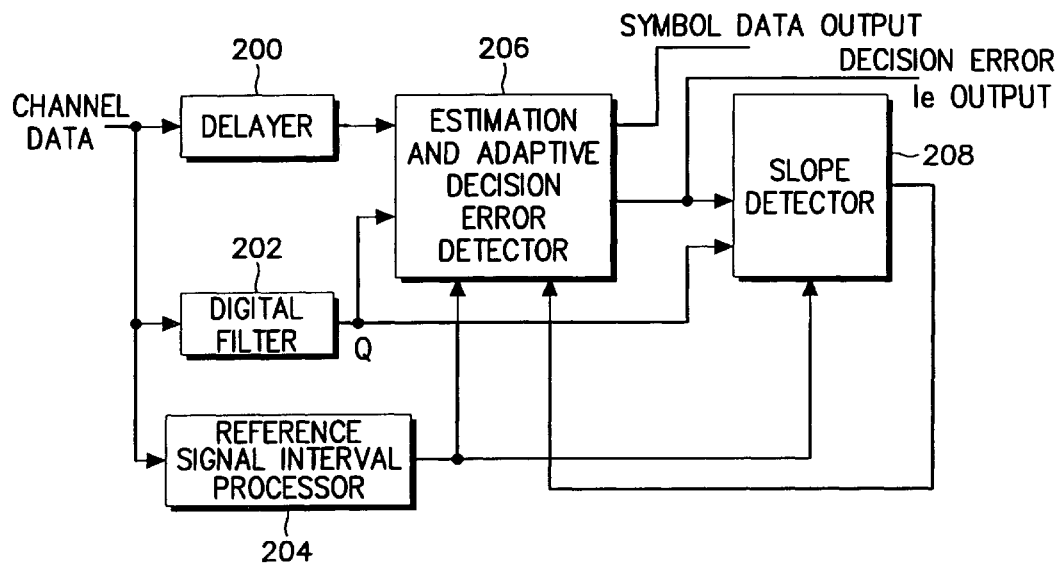
FIG. 7 is a block diagram of a circuit for adaptively calculating a decision error according to another preferred embodiment of the present invention.

FIG. 7 shows another circuit for adaptively calculating the decision error. In FIG. 7, the decision region is limited by using the Q channel data as well as the I channel data to improve the reliability of the decision error.

A digital filter 202 digitally filters the input I channel data to generate Q channel sign data which differs in phase from the I channel data. A delayer 200 delays the input I channel data for the filtering time of the digital filter 202. A reference signal interval processor 204 receives the I channel data and generates the reference signal pulse for detecting the slope. An estimation and adaptive decision error detector 206 receives the delayed I channel data during the detected interval of the reference signal pulse and the Q channel data, decides the symbol data and generates the decision error value according to the slope. A slope detector 208 receives the decision error value generated from estimation and adaptive decision error detector 206 and the Q channel sign data generated from the digital filter 202, accumulates the slope during the detected interval of the reference signal pulse, and supplies the accumulated slope to the estimation and adaptive decision error detector 206.

Figure 8:
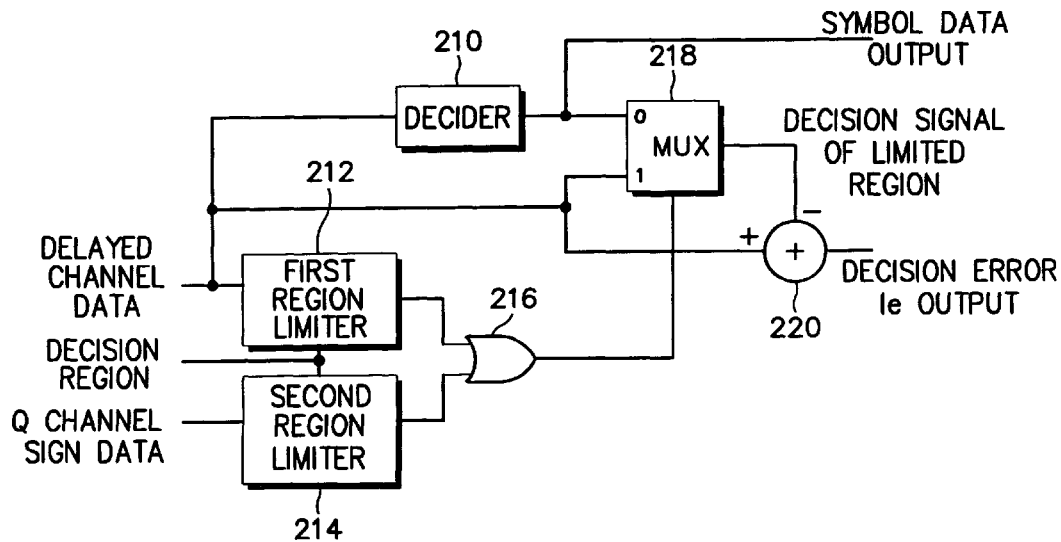
FIG. 8 is a detailed block diagram of an estimation and adaptive decision error detector shown in FIG. 7.

FIG. 8 is a detailed block diagram of the estimation and adaptive decision error detector 206 shown in FIG. 7. A decider 210 receives the I channel data delayed from the delayer 200 and decides the symbol data to the reference level value. A first region limiter 212 compares the I channel data delayed from the delayer 200 with an I channel decision region corresponding to the calculated slope and generates a limited I channel region decision signal. A second region limiter 214 compares the Q channel sign data generated from the digital filter 202 with a Q channel decision region corresponding to the calculated slope and generates a limited Q channel region decision signal. An OR gate 216 receives the I and Q channel region decision signals generated from the first and second region limiters 212 and 214. A MUX 218 receives the symbol data generated from the decider 210 and the delayed I channel data and selectively generates one of the input signals in response to the region decision signal generated from the OR gate 216. A subtracter 220 subtracts a signal generated from the MUX 114 from the delayed I channel data to generate the decision error signal Ie.

Figure 9:
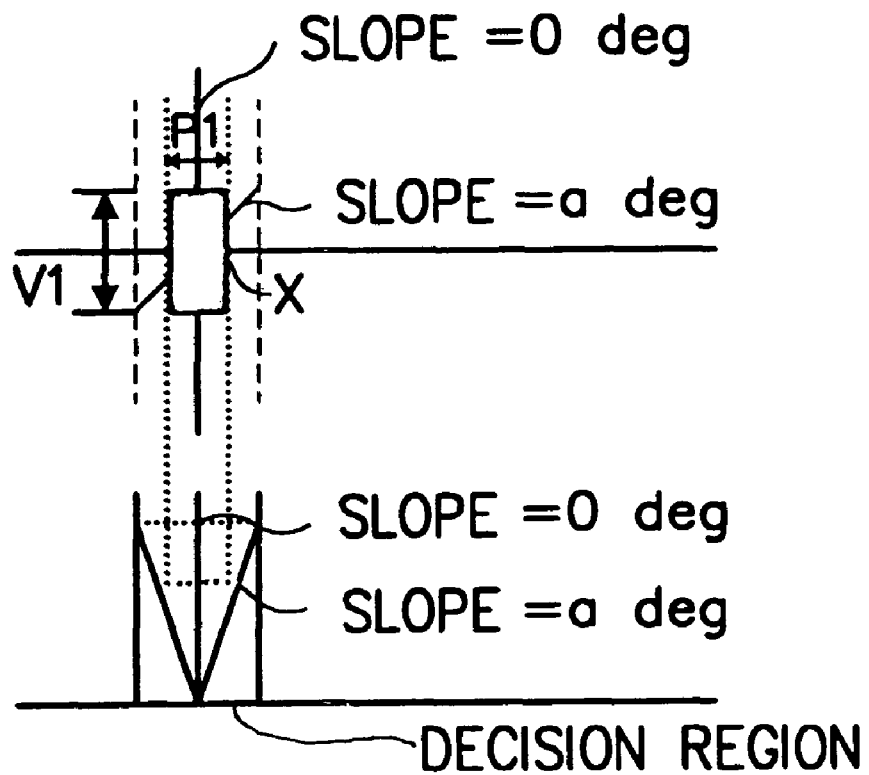
FIG. 9 is an operational waveform chart of FIG. 7.

FIG. 9 is a waveform showing characteristics of the operation of slope detector 208 of FIG. 7.

Another preferred embodiment of the present invention will now be described with reference to FIGS. 7 to 9.

The digital filter 202 shown in FIG. 7 recovers the Q channel sign data from the input I channel data. The delayer 200 delays the input I channel data for the filtering time of the digital filter 202. The reference signal interval processor 204 detects the reference signal pulse for detecting the slope from the I channel data and supplies the reference signal pulse to the estimation and adaptive decision error detector 206 and the slope detector 208. The estimation and adaptive decision error detector 206 decides the I channel symbol data and generates the decision error signal Ie. In the estimation and adaptive decision error detector 206 of FIG. 7, the first region limiter 212 compares the I channel data with the decision region to limit the I channel decision region. If the I channel data is within the range of the limited region, the region limiter 212 generates "0". If the I channel data is beyond the range of the limited region, the region limiter 12 generates "1". The second region limiter 214 compares the Q channel data generated from the digital filter 202 with the decision region to limit the Q channel decision region. If the Q channel data is within the range of the limited region, the second region limiter 214 generates "0", and if not, it generates "1". The I and Q channel decision region limit signals generated from the first and second region limiters 212 and 214 are supplied to the OR gate 216. The output of the OR gate 216 is applied to the select terminal of the MUX 218. The decider 210 decides the symbol value of the I channel data to the setting reference level. If there are 8 levels and if the I channel data is between 0 and 2, the decision output is "1". In case of a boundary portion, for example, 2, 4 or 6 etc., the same rule of rounding it up or down is applied. The MUX 218 selectively generates either the decision signal decided from the decider 210 or the I channel data in response to signals generated from the first and second region limiters 212 and 214. Therefore, if the output signals of the first and second region limiters 212 and 214 are "1", the MUX 218 generates the I channel data since the input signals of the first and second region limiters 212 and 214 do not exist within the range of the limited region. The subtracter 220 subtracts the I channel data of the same input signal from the I channel data to generate the decision error signal Ie of "0". Meanwhile, the outputs of the first and second region limiters 212 and 214 are "0", the MUX 218 generates the output signal of the decider 210 since the input signals of the first and second region limiters 212 and 214 are within the range of the limited region corresponding to the calculated slope. The subtracter 220 subtracts the decision signal decided to the setting reference level from the I channel data to generate the decision error Ie. The slope detector 208 calculates the slope value a by the above equations (1), (2) and (3) with respect to the levels +S and −S while the reference signal pulse is detected from the reference signal interval processor 204. If the detected interval of the reference signal interval is over, the decision region for detecting the decision error by the estimation and adaptive decision error detector 206 is limited as shown in FIG. 9. Until the next reference signal is received, the estimation and adaptive decision error detector 206 operates with the fixed slope. The decision region is limited according to the calculated slope as shown in FIG. 9. The input signal beyond the range of the decision region is not used. It is preferable to limit the decision region by not only the I channel but also the Q channel since the actual channel conditions have an effect on both the I and Q channels. The decision region of the Q-channel is limited to the range V1, shown in FIG. 9, which corresponds to the nominal levels of the I-channel. Therefore, the decision region of the I and Q channels is limited according to the slope obtained by the slope detector 208 as shown in FIG. 9. When calculating the slope a from the random signal, the reference signal interval processor 204 may use the interval signal pulse generator, and the slope is calculated by using all the random data.

In the above embodiments of the present invention, the Q channel data is calculated from the I channel data to adaptively limit the region for deciding the digital data. However, the digital data can be directly decided from the I channel data and the Q channel data separated from the received data. In this case, the decision error can be obtained by limiting the region for calculating the digital data without the delayers 100 and 200 and the digital filters 102 and 202 used in FIGS. 3 and 7.

As described above, in order to improve the accuracy of the decision error, a signal error is detected according to the slope. The region for calculating the decision error is adaptively limited on the basis of the slope. Therefore, a reliable decision error can be obtained. When using the coding for the Q channel data, the phase error can be obtained using only information relating to the direction without estimating an accurate Q value. Consequently, an accurate digital filter is not necessary and the hardware construction of the digital filter can be simplified. Furthermore, an accurate decision can be made by limiting the decision region of the I and Q channel values.

It should be understood that the present invention is not limited to the specific embodiments described in this specification.

What is claimed is:

1. A circuit for adaptively calculating a decision error of a digital signal by limiting a decision error region in a digital modulation system, said circuit comprising:

a digital filter for Hilbert transform filtering I channel data to generate Q channel data which differs in phase from said I channel data;

a delayer for delaying said I channel data for a filtering time of said digital filter;

a reference signal interval processor for receiving said I channel data and generating a reference signal pulse for detecting a slope;

an estimation and adaptive decision error detector for receiving said I channel data delayed by said delayer during a detected interval of said reference signal pulse, deciding symbol data and generating an adaptive decision error signal according to the detected slope; and a slope detector for receiving said decision error signal generated by said estimation and adaptive decision error detector and said Q channel data generated by said digital filter, detecting the slope during the detected interval of said reference signal pulse and generating an accumulated slope.

2. The circuit as set forth in claim 1, wherein said slope detector detects a slope a according to the following equations:

$$a = -\frac{1}{N}\sum_N \text{ATAN}\frac{Ie}{Q} - 1$$

$$I_e = I' - I''$$

where I' is an input signal, I'' is a symbol data value of a decision result, Ie is a decision error signal, and N is a number of symbols within the detected interval of said reference signal pulse.

3. The circuit as set forth in claim 2, wherein said estimation and adaptive decision error detector includes:

a decider for receiving said I channel data delayed by said delayer and deciding symbol data to a reference level value;

a region limiter for comparing said I channel data delayed by said delayer with a decision region corresponding to the detected slope and generating a limited region decision signal;

a multiplexer for receiving said symbol data decided from said decider and said I channel data delayed by said delayer and selectively generating either said symbol data or said delayed I channel data according to said limited region decision signal generated by said region limiter; and a subtracter for subtracting a signal generated by said multiplexer from said I channel data delayed by said delayer to generate said decision error signal.

4. A circuit for adaptively calculating a decision error of a digital signal by limiting a decision error region in a digital modulation system, said circuit comprising:

a digital filter for digitally filtering I channel data to generate Q channel sign data which differs in phase from said I channel data;

a delayer for delaying said I channel data for a filtering time of said digital filter;

a reference signal interval processor for receiving said I channel data and generating a reference signal pulse for detecting a slope;

an estimation and adaptive decision error detector for receiving said Q channel sign data and said I channel data delayed by said delayer during a detected interval of said reference signal pulse, deciding symbol data and generating said decision error signal according to the detected slope; and a slope detector for receiving said decision error signal generated by said estimation and adaptive decision error detector and said Q channel sign data generated by said digital filter, detecting the slope during the detected interval of said reference signal pulse and generating an accumulated slope.

5. The circuit as set forth in claim 4, wherein said estimation and adaptive decision error detector includes:
- a decider for receiving said I channel data delayed by said delayer and deciding symbol data to a reference level value;
- a first region limiter for comparing said I channel data delayed by said delayer with an I channel decision region corresponding to the detected slope and generating a limited I channel region decision signal;
- a second region limiter for comparing said Q channel sign data generated by said digital filter with a Q channel decision region corresponding to the detected slope and generating a limited Q channel region decision signal;
- a logic gate for ORing said limited I and Q channel region decision signals generated by said first and second region limiters;
- a multiplexer for receiving said symbol data generated by said decider and said I channel data delayed by said delayer and selectively generating one of the received data by a region decision signal generated by said logic gate; and
- a subtracter for subtracting a signal generated by said multiplexer from said delayed I channel data to generate said decision error signal.

6. The circuit as set forth in claim 5, wherein said slope detector detects a slope a according to the following equations:

$$a = -\frac{1}{N}\sum_N \text{sgn}(Q)Ie - 2$$

$$I_e = I' - I''$$

where I' is an input signal, I'' is a symbol data value of a decision result, Ie is a decision error signal, N is a number of symbols within the detected interval of said reference signal pulse, and sgn(Q) is Q channel sign data.

7. A circuit for adaptively calculating a decision error of a digital signal by limiting a decision error region in a digital modulation system, said circuit comprising:
- a reference signal interval processor for receiving I channel data and generating a reference signal pulse for detecting a slope;
- an estimation and adaptive decision error detector for receiving said I channel data during a detected interval of said reference signal pulse, deciding symbol data according to the slope and generating a decision error signal; and
- a slope detector for receiving said decision error signal generated by said estimation and adaptive decision error detector and Q channel data, detecting the slope during the detected interval of said reference signal pulse and generating an accumulated slope.

8. The circuit as set forth in claim 7, wherein said slope detector detects a slope a according to the following equations:

$$a = -\frac{1}{N}\sum_N \text{ATAN}\frac{Ie}{Q} - 3$$

$$I_e = I' - I''$$

wherein I' is an input signal, I'' is a symbol data value of a decision result, Ie is a decision error signal, and N is a number of symbols within the detected interval of said reference signal pulse.

9. The circuit as set forth in claim 8, wherein said estimation and adaptive decision error detector includes:
- a decider for receiving said I channel data and deciding symbol data to a reference level value;
- a region limiter for comparing said I channel data with a decision region corresponding to the detected slope and generating a limited region decision signal;
- a multiplexer for receiving said symbol data decided by said decider and said I channel data and selectively generating either said symbol data or said I channel data by said limited region decision signal generated by said region limiter; and
- a subtracter for subtracting a signal generated by said multiplexer from said I channel data to generate said decision error signal.

10. A circuit for adaptively calculating a decision error of a digital signal by limiting a decision error region in a digital modulation system, said circuit comprising:
- a reference signal interval processor for receiving I channel data and generating a reference signal pulse for detecting a slope;
- an estimation and adaptive decision error detector for receiving said I channel data and Q channel sign data during a detected interval of said reference signal pulse, deciding symbol data according to a detected slope and generating a decision error signal; and
- a slope detector for receiving said decision error signal generated by said estimation and adaptive decision error detector and said Q channel sign data, detecting the slope during the detected interval of said reference signal pulse and generating an accumulated slope.

11. The circuit as set forth in claim 10, wherein said estimation and adaptive decision error detector includes:
- a decider for receiving said I channel data and deciding symbol data to a reference level value;
- a first region limiter for comparing said I channel data with an I channel decision region corresponding to the detected slope and generating a limited I channel region decision signal;
- a second region limiter for comparing said Q channel sign data with a Q channel decision region corresponding to the detected slope and generating a limited Q channel region decision signal;
- a logic gate for ORing said limited I and Q channel region decision signals generated by said first and second region limiters;
- a multiplexer for receiving said symbol data generated by said decider and said I channel data and selectively generating one of the received data according to a region decision signal generated by said logic gate; and
- a subtracter for subtracting a signal generated by said multiplexer from said I channel data to generate said decision error signal.

12. The circuit as set forth in claim 11, wherein said slope detector detects a slope a according to the following equations:

$$a = \left|\frac{1}{N}\sum_N \text{sgn}(Q)Ie\right|$$

$$I_e = I' - I''$$

where I' is an input signal, I" is a symbol data value of a decision result, Ie is a decision error signal, N is the number of symbols within the detected interval of said reference signal pulse, and sgn(Q) is Q channel sign data.

13. A circuit for adaptively calculating a decision error of a digital signal by limiting a decision error region in a digital modulation system, said circuit comprising:

a pulse generator for generating an interval signal for detecting a slope from I channel data;

an estimation and adaptive decision error detector for receiving said I channel data and Q channel sign data while said interval signal is being generated by said pulse generator, deciding symbol data according to a detected slope and generating a decision error signal; and a slope detector for receiving said decision error signal generated by said estimation and adaptive decision error detector and said Q channel sign data, detecting the slope while said interval signal is being generated and generating an accumulated slope.

14. The circuit as set forth in claim 13, wherein said estimation and adaptive decision error detector includes:

a decider for receiving said I channel data and deciding symbol data to a reference level value;

a first region limiter for comparing said I channel data with an I channel decision region corresponding to the detected slope and generating a limited I channel region decision signal;

a second region limiter for comparing said Q channel sign data with a Q channel decision region corresponding to the detected slope and generating a limited Q channel region decision signal;

a logic gate for ORing said limited I and Q channel region decision signals generated by said first and second region limiters;

a multiplexer for receiving said symbol data generated by said decider and said I channel data and selectively generating one of the received data by a region decision signal generated by said logic gate; and a subtracter for subtracting a signal generated by said multiplexer from said I channel data to generate said decision error signal.

15. The circuit as set forth in claim 14, wherein said slope detector detects a slope a according to the following equations:

$$a = \left| \frac{1}{N} \sum_N \text{sgn}(Q) Ie \right|$$

$$I_e = I' - I''$$

where I' is an input signal, I" is a symbol data value of a decision result, Ie is a decision error signal, N is the number of symbols within the detected interval of said reference signal pulse, and sgn(Q) is Q channel sign data.

16. A method for adaptively calculating a decision error of a digital signal by limiting a decision error region in a digital modulation system, said method comprising the steps of:

detecting a reference signal pulse from I channel data;

receiving said I channel data and Q channel data during a detected interval of said reference signal pulse and deciding symbol data according to said I channel data and Q channel data of a limited region; and adaptively calculating a decision error signal according to a slope calculated from said symbol data.

17. A method for adaptively calculating a decision error of a digital signal by limiting a decision error region in a digital modulation system, said method comprising the steps of:

detecting a reference signal pulse from I channel data;

receiving said I channel data and Q channel sign data during a detected interval of said reference signal pulse and deciding symbol data by said I channel data and Q channel sign data of a limited region; and adaptively calculating a decision error signal according to a slope calculated from said symbol data.

* * * * *